US011344999B2

(12) United States Patent
Hval

(10) Patent No.: US 11,344,999 B2
(45) Date of Patent: May 31, 2022

(54) HYDRAULIC PRESSURE VESSEL LONG SEAM WELDING JIG

(71) Applicant: Jeff Hval, Calgary (CA)

(72) Inventor: Jeff Hval, Calgary (CA)

( * ) Notice: Subject to any disclaimer, the term of this patent is extended or adjusted under 35 U.S.C. 154(b) by 295 days.

(21) Appl. No.: 16/841,740

(22) Filed: Apr. 7, 2020

(65) Prior Publication Data

US 2021/0308836 A1    Oct. 7, 2021

(51) Int. Cl.
*B25B 5/00* (2006.01)
*B25B 5/06* (2006.01)
*B23K 37/04* (2006.01)

(52) U.S. Cl.
CPC .......... *B25B 5/061* (2013.01); *B23K 37/0452* (2013.01)

(58) Field of Classification Search
CPC .......... B25B 5/00; B25B 5/006; B25B 5/061; B25B 11/00; B23K 37/00; B23K 37/0452
See application file for complete search history.

(56) References Cited

U.S. PATENT DOCUMENTS

| 4,527,786 A * | 7/1985 | Hsu ............ B25B 1/2426 269/154 |
| 5,791,034 A * | 8/1998 | Verret .......... G09F 15/0025 269/37 |
| 6,579,051 B2 * | 6/2003 | Echternacht ...... E04G 21/16 280/43.24 |
| 2021/0308836 A1 * | 10/2021 | Hval ............ B23K 37/0452 |

\* cited by examiner

*Primary Examiner* — Lee D Wilson
(74) *Attorney, Agent, or Firm* — David W Barman

(57) ABSTRACT

A hydraulic pressure vessel long seam welding jig device having a triangular frame, a pair of hydraulically actuated clamp mechanisms each having a clamp activating hydraulic cylinder operatively associated therewith, whereby each of the clamp mechanisms are positioned on opposite ends of the carriage beam and arranged to hold a workpiece during a long seam welding operation.

6 Claims, 10 Drawing Sheets

SECTION "A-A" OF FIG.6

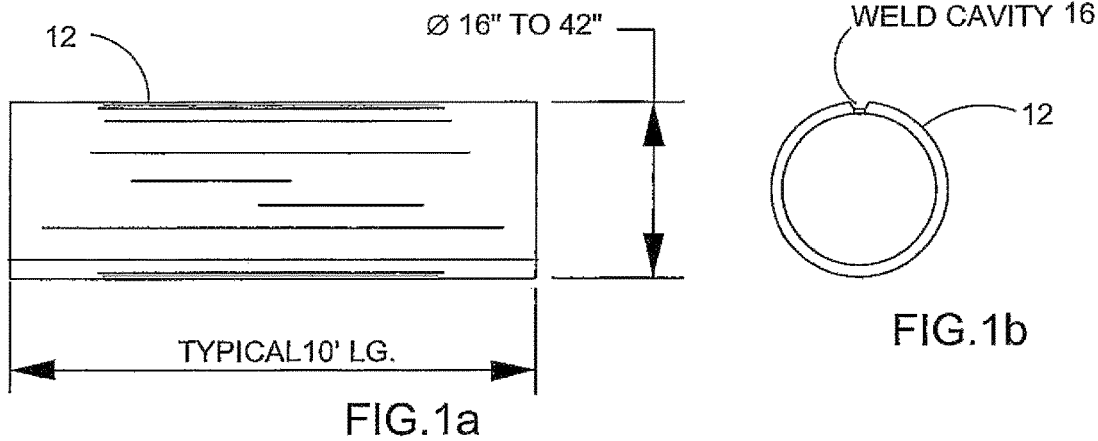
FIG.1a
FIG.1b
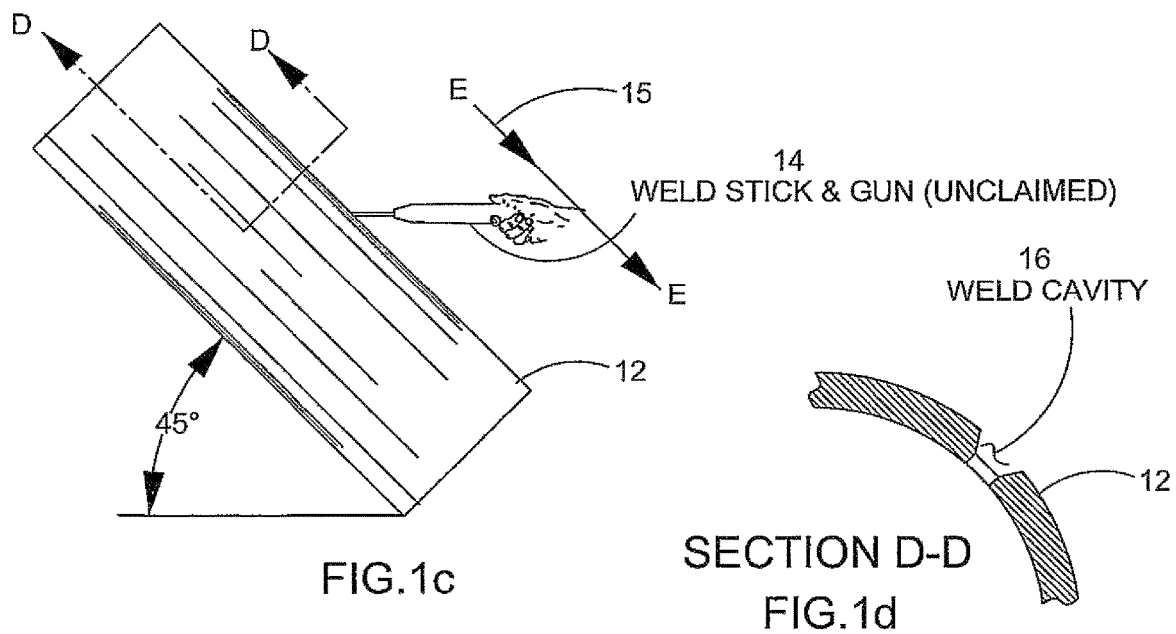
FIG.1c
SECTION D-D
FIG.1d

SECTION "A-A" OF FIG.6

SECTION "B-B" OF FIG.6
OPEN POSITION

SECTION "B-B" OF FIG6
CLOSED POSITION

HYDRAULIC PRESSURE VESSEL LONG SEAM WELDING JIG

BACKGROUND OF THE INVENTION

Artisans that are involved in the welding activity are constantly struggling to utilize assistive devices in order to successfully weld and complete desired tasks. The endeavor of locating assistive devices becomes increasingly difficult when work pieces are larger.

There is a need for an assistive holding device constructed and arranged to assist with welding activities of large work pieces.

The present invention addresses this need.

SUMMARY OF THE INVENTION

The present invention provides an article which is an assistive device that improves the safety, efficiency, and accessibility for welding work pieces having long seams. Safety, being an extremely important issue, is accomplished utilizing a novel configuration of components to secure the workpiece into a fixed position such that the workpiece can be oriented in an angular orientation and the welder can safely weld as needed.

A workpiece is raised and placed on a carriage beam of the present invention initially in a horizontal orientation relative to the ground. The workpiece is secured into position and the system orients the carriage beam to an angular orientation as desired. Without the novel device and system of the present invention, persons have been required to weld while standing over 10 feet on ladders or other elevation devices. Working over 10 feet requires the worker to wear fall protection. There is a significant safety issue present when a person is welding while standing on ladders. Without this present invention, persons have also been required to rig the workpiece at an angle using devices such as slings and chains. Then the workers are using makeshift props to prevent the round workpiece from rolling, falling or tipping while they are welding on it at an angle. Using the current invention eliminates the significant aforementioned safety risks to the worker.

In one embodiment, a completed vessel is oriented either vertical or horizontal. The device of the present invention is only for welding the long seam after plate is beveled and rolled.

In one embodiment, the device orients to a 45-degree angle relative to the ground. All pressure vessel shells that are made out of rolled plate must be welded in a down hand progression 45 degrees for the root pass.

Moving the workpiece to a 45-degree angle is faster than currently used conventional systems and methods. This is because rigging the shell with sling(s) or chain(s) in other configurations to get the shell at an angle is very dangerous. Using the present invention, an artisan welder will lift the workpiece in the horizontal position with hooks and place it in the carriage beam on the machine, lock it into place, before removing the rigging. Also, the machine tilts both ways so you are not working high on a ladder. This saves time over existing methodology.

The present invention is particularly applicable to the welding fixture being a tubular workpiece. This is because pressure vessels must be round for strength to contain pressure.

The invention is particularly suitable for vessel shells 10' long ranging from 16-inch diameter to 48-inch diameter. In one embodiment, the capacity is 10,000 lbs.

The table can work with 8-foot-long and shorter shells placed on the lift cylinder side of the table. This can be done by placing the shell up against the stops on the right side and cycling the one right clamp. This will allow tilting down to the 45-degree angle safely on the one side only for shells under 10 feet.

The stops at each end of the carriage beam are a guide to place the shell on the beam, they are welded in place. When the clamps are cycled closed the shell will not move. Meaning, the clamps do not generate movement of the shell against the stops. There is enough force from the clamps that the shell does not move even with a small gap between the shell and stops.

In one embodiment, the stops are a safety in case the vessel shell shifts under the clamp when tilted at 45 degrees. The present invention is tested and used on many different diameter and thickness of vessel shells and when the clamps are closed the shell doesn't move at all.

In one embodiment, the invention is hydraulic pressure vessel long seam welding jig device comprising:

a triangular frame having a base configured for placement on a floor or other horizontal flat surface and an upper apex; a carriage beam having a center affixed to said triangular frame apex in a configuration permitting said carriage beam to tilt in an angular orientation relative to said triangular frame base; a pair of hydraulically actuated clamp mechanisms each having a clamp activating hydraulic cylinder operatively associated therewith, whereby each of said clamp mechanisms are positioned on opposite ends of said carriage beam;

a titling hydraulic cylinder; and a hydraulic system constructed and arranged to actuate each of said activating hydraulic cylinder and titling hydraulic cylinder, whereby said jig is constructed and arranged to hold a workpiece during a long seam welding operation.

In one embodiment, the titling hydraulic cylinder is attached at one end to said triangular frame and at another end to said carriage beam.

In one embodiment, the clamp mechanisms include a pair of stops.

In one embodiment, the clamp mechanisms include a pair of fixed non-movable stops.

In one embodiment, the clamp mechanisms include a pair of movable stops.

In one embodiment, the clamp mechanisms include a clamp arm actuated into a closed and locked position by said clamp activating hydraulic cylinder.

BRIEF DESCRIPTION OF THE SEVERAL VIEWS OF THE DRAWINGS

FIG. 1A is a side view of a shell the type of which is used according to one embodiment of the present invention.

FIG. 1B is an end view of the shell from FIG. 1A.

FIG. 1C demonstrates a desired angular orientation for welding a shell utilizing the present invention.

FIG. 1D is a partial cross-section view along sectional lines D-D from FIG. 1C.

DETAILED DESCRIPTION OF THE PREFERRED EMBODIMENT

Figure 2:
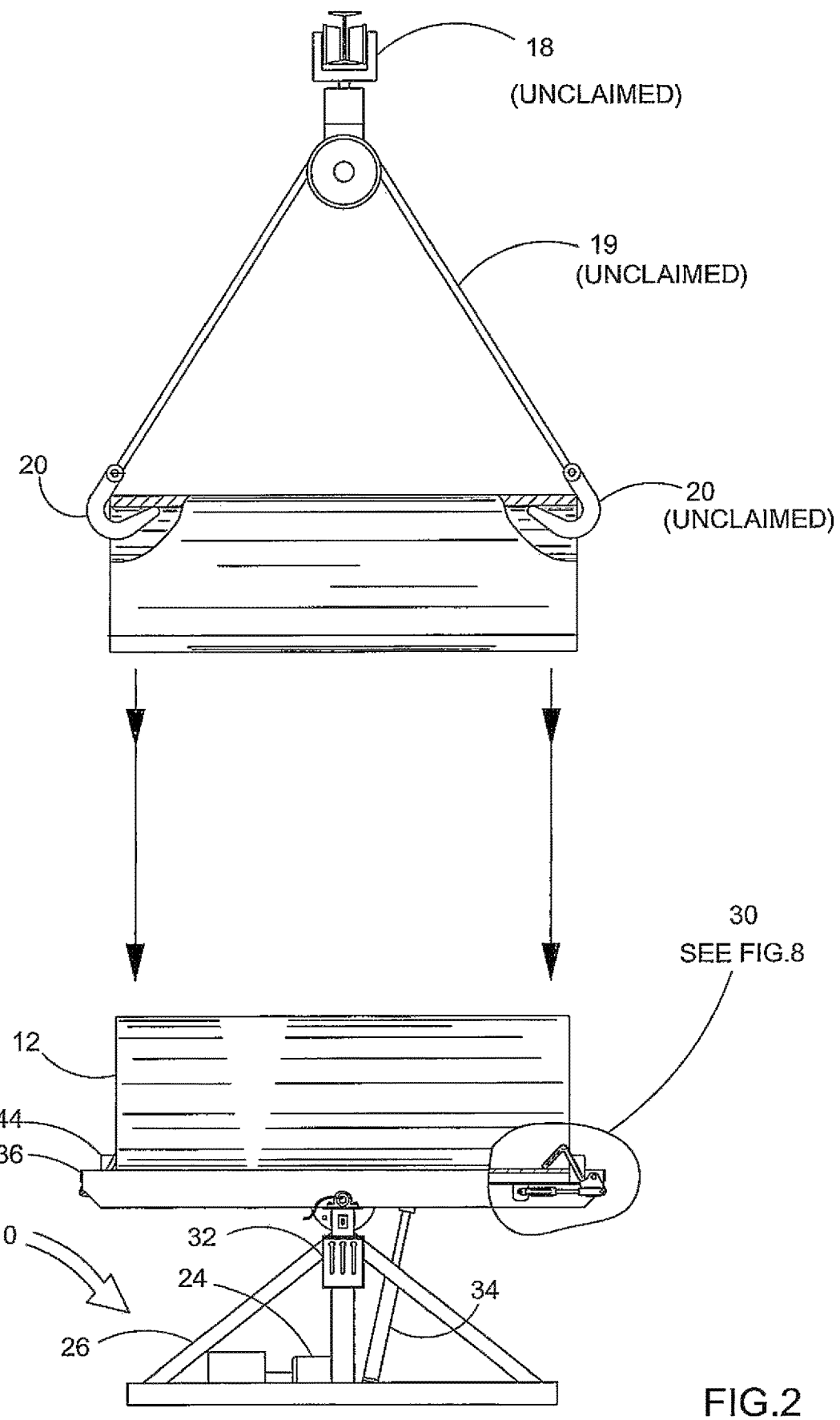
FIG. 2 is a side view demonstrating with direction arrows placement of a shell on to a system according to one embodiment of the present invention.
Figure 3:
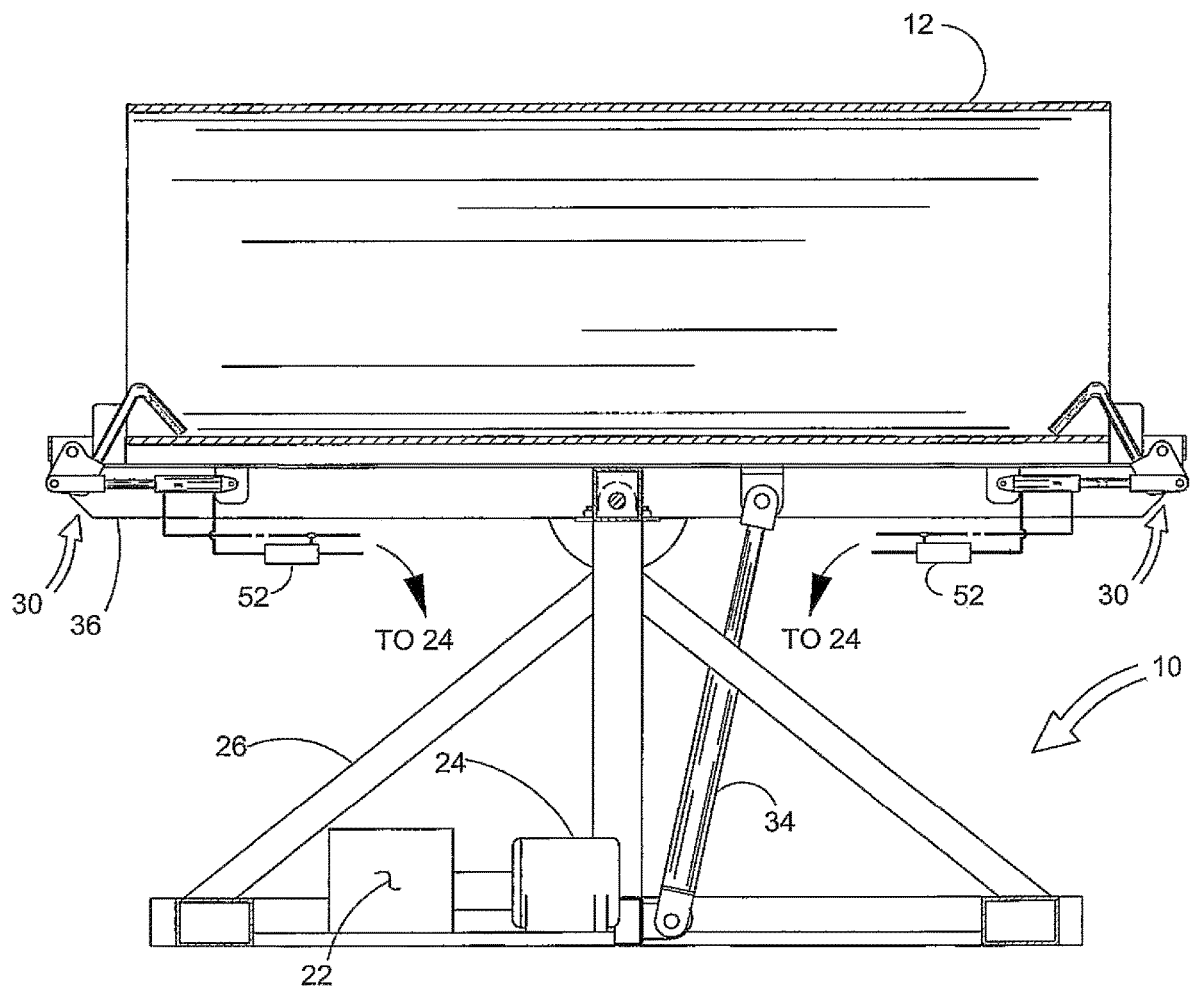
FIG. 3 is a side partial cross-section view along section lines A-A from FIG. 6 demonstrating the securing of a shell into a position according to one embodiment of the present invention.

As generally understood, weld fixture system 10 is constructed and arranged to secure and hold shell 12. Although the figures and description herein specifically demonstrates use with shell 12, the device and system of the present invention is contemplated as suitable for any workpiece requiring being held into a fixed position during the welding process. Therefore, shell 12 is only a single example of the contemplated workpiece according to the present invention.

Frame 26 has associated therewith, tilting hydraulic cylinder 34 that is controlled using hydraulic control panel 32. Frame 26 also incorporates hydraulic pump 24. Carriage beam 36 includes opposing clamp mechanism systems 30 that are construction arranged to hold shell 12 into position during the tilting and welding process. Carriage beam 36 and a pair of opposing stops 44 that are welded into position and further contribute to securing shell 12 during the tilting and welding process.

In use, as demonstrated in FIG. 2, shell 12 is lowered onto weld fixture system 10 using Overhead Crane and/or hoist 18 with cables 19 having sling securing hooks 20 formed and positioned to hold shell 12 and lower shell 12 onto weld fixture system 10.

Figure 4:
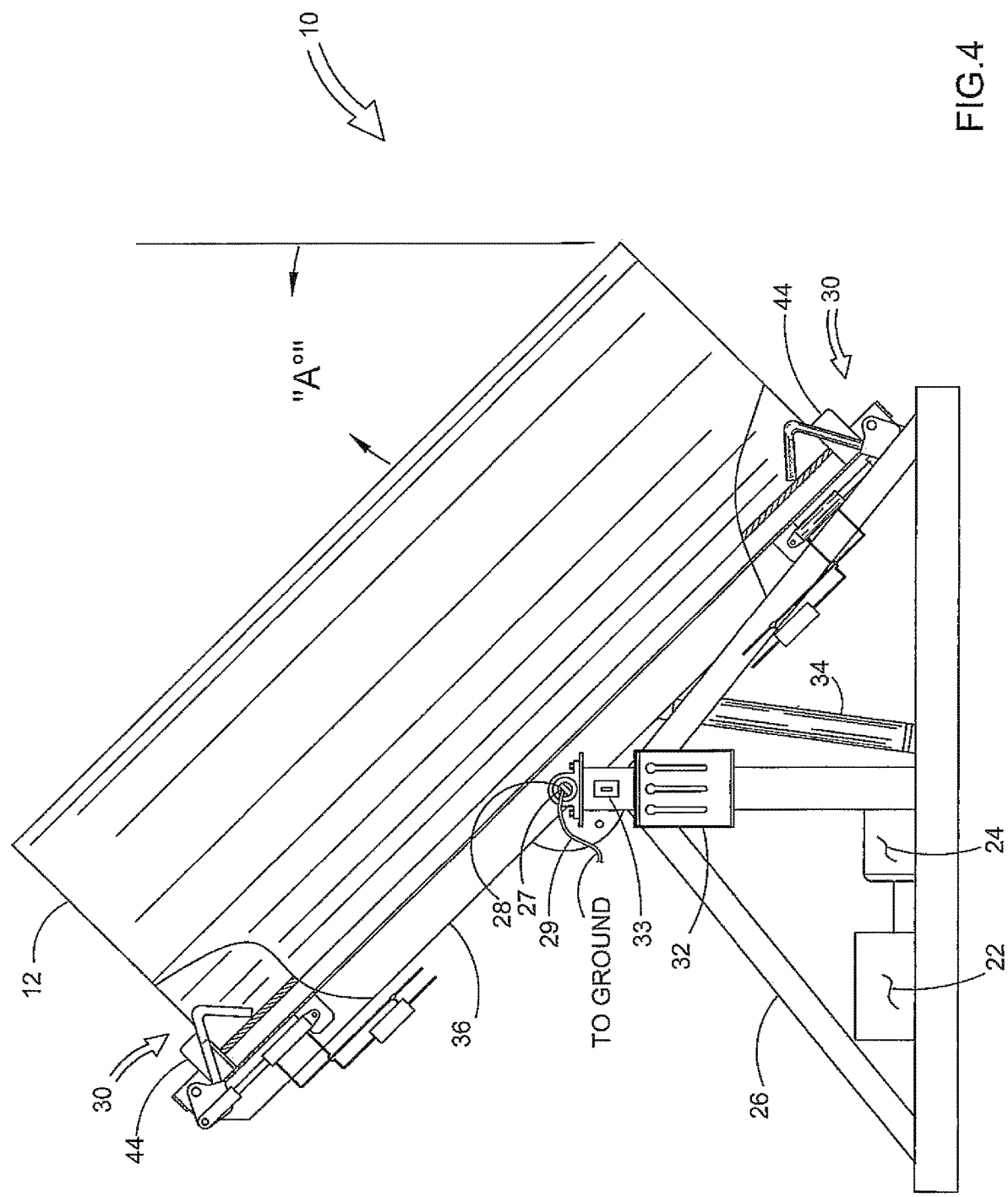
FIG. 4 is a side view showing partial cross-section of the shell whereby the shell is in an angular orientation according to one embodiment of the present invention.
Figure 8:
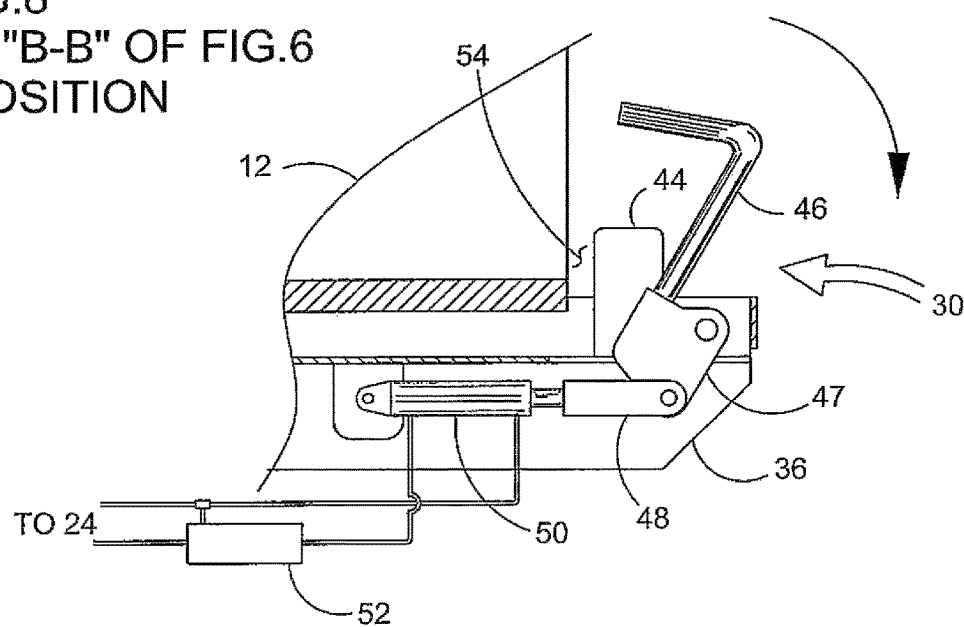
FIG. 8 is a side partial cross-section view demonstrating an open position of the clamp according to one embodiment of the present invention.
Figure 9:
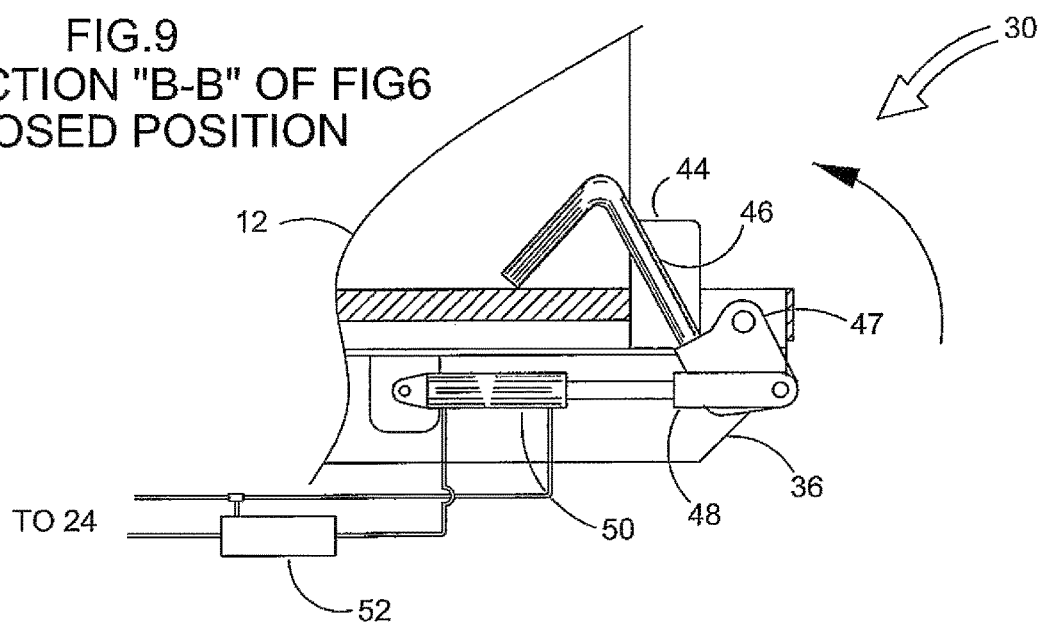
FIG. 9 is a side partial cross-section view demonstrating a closed position of the clamp according to one embodiment of the present invention.
Figure 10:
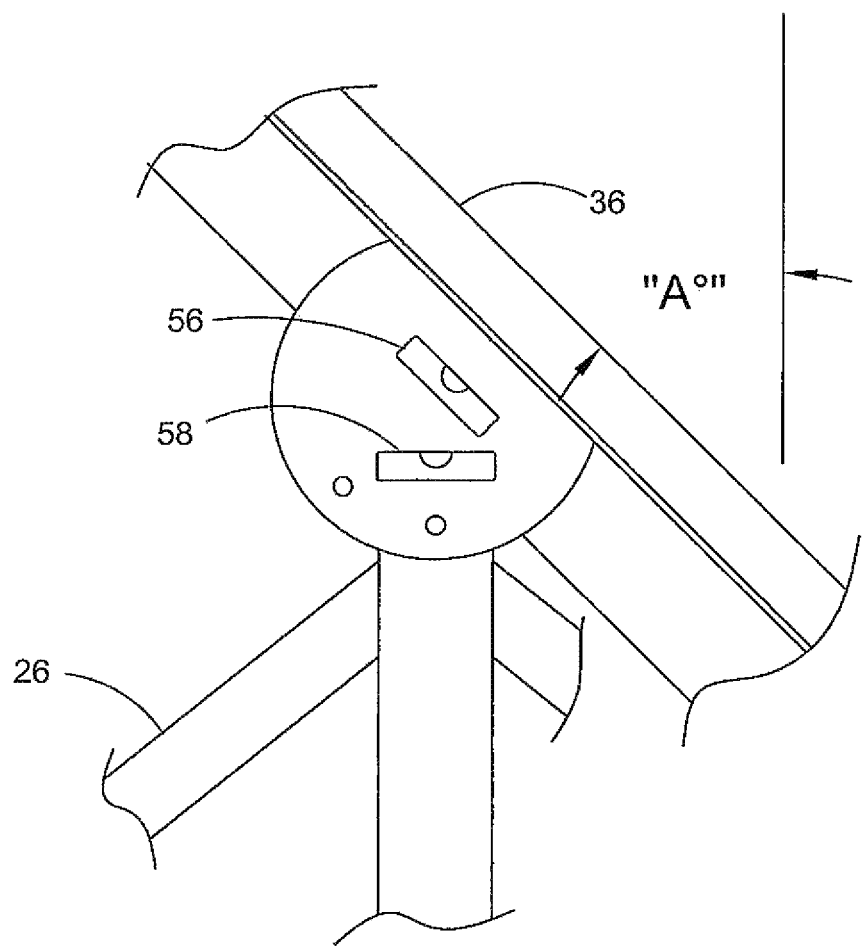
FIG. 10 is an enlarged deal of level indicators according to one embodiment of the present invention.

Once shell 12 is on carriage beam 36, each of stops 44 are positioned to secure shell 12 and clamp mechanisms 30 positioned on either end of carriage beam 36 are moved from an open position as demonstrated in FIG. 8 to a closed position as demonstrated in FIG. 9. The combination of stops 44 and clamp mechanisms 30 secure shell 12 into a fixed position such that shell 12 will not move when carriage being 36 is tilted into an angular orientation as can be seen in FIG. 4.

Figure 5:
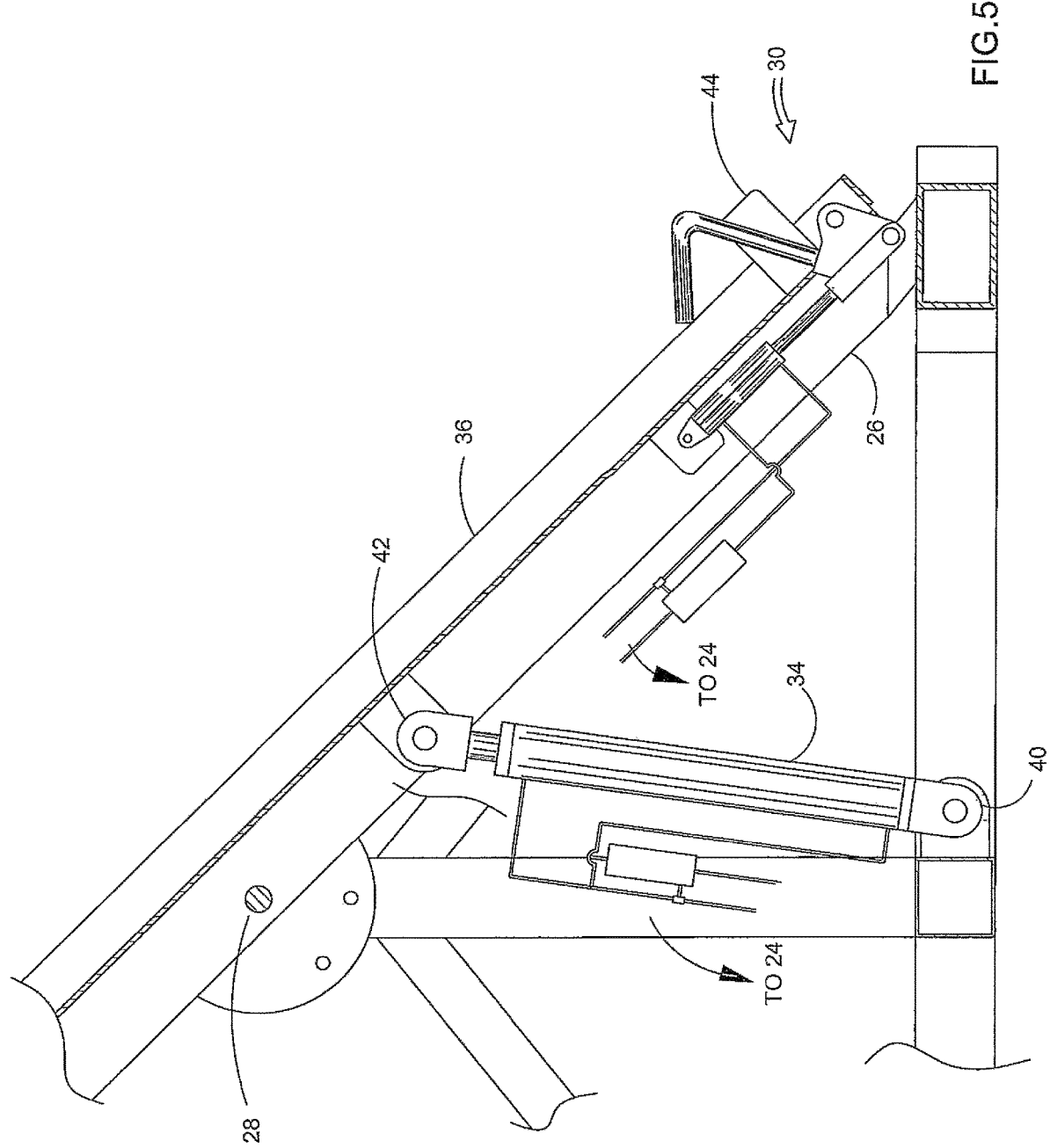
FIG. 5 is a side partial view demonstrative of the tilt and clamp components according to one embodiment of the present invention.
Figure 6:
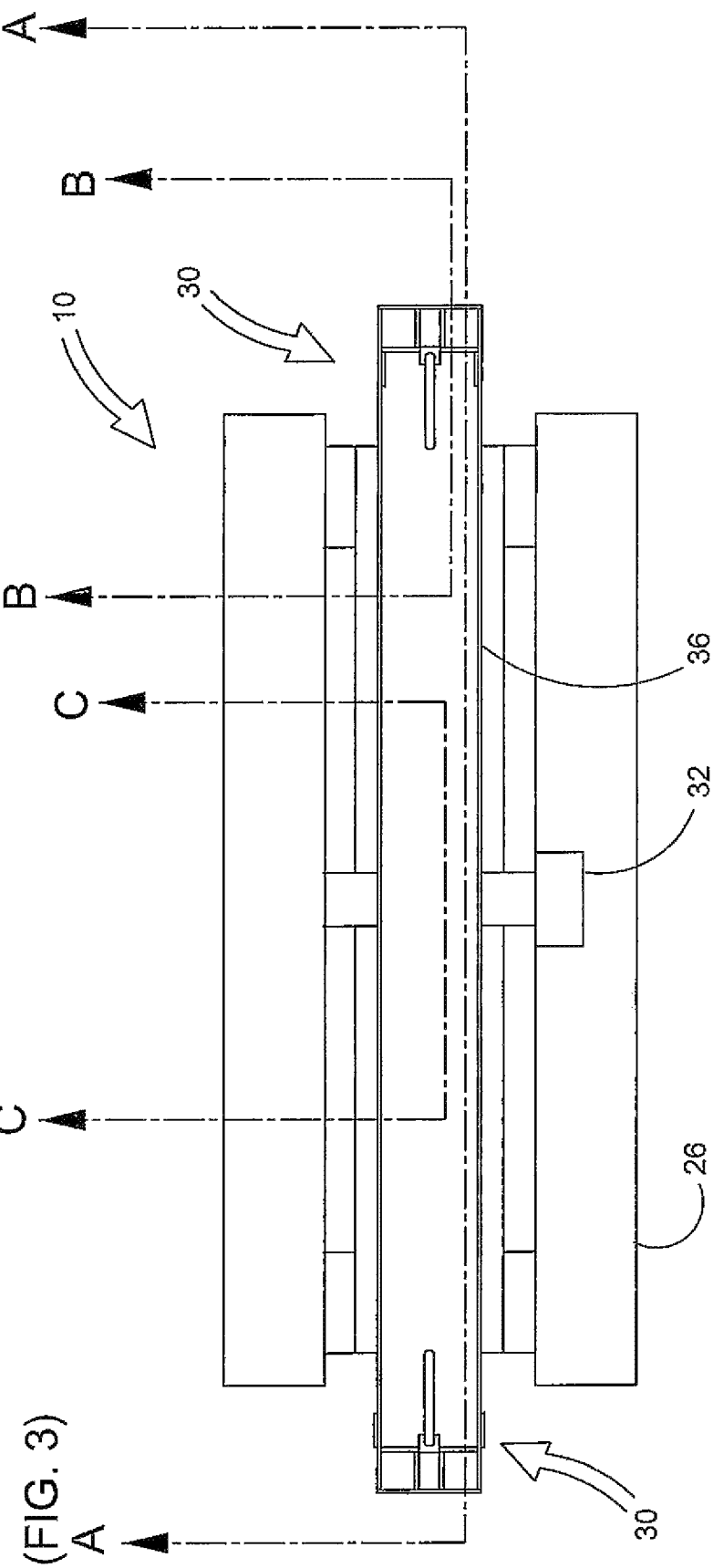
FIG. 6 is a top plan view according to one embodiment of the present invention.
Figure 7:
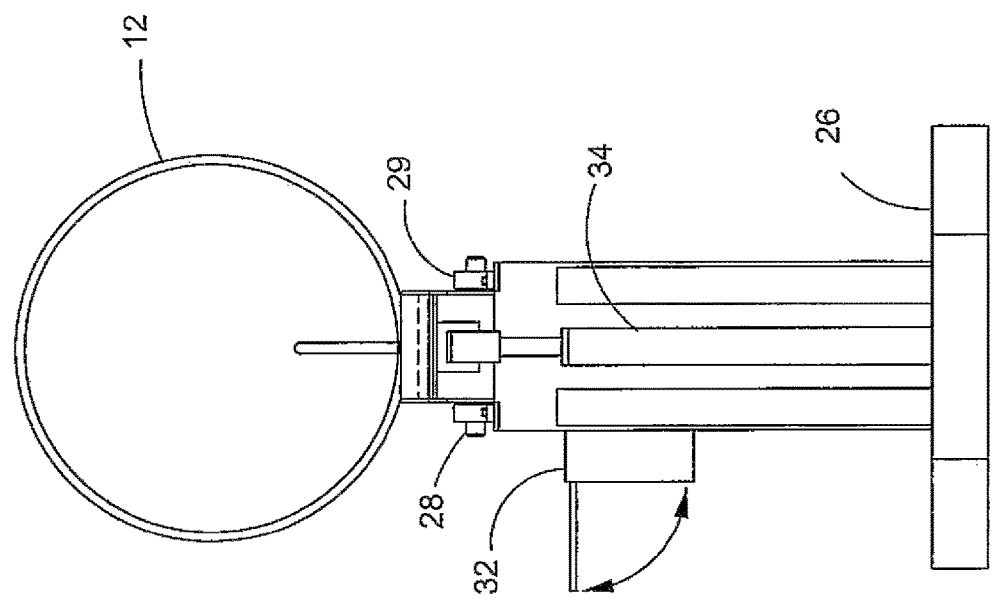
FIG. 7 is a partial end view according to one embodiment of the present invention.

Weld fixture system 10 further includes hydraulic fluid reservoir 22 operatively associated with hydraulic pump 24 that ultimately is associated with movement of tilting hydraulic cylinder 34. As demonstrated in FIG. 5, hydraulic cylinder 34 with a lower tilting cylinder bracket 40 attaching cylinder 34 to the base of fixture frame 26 and upper tilting cylinder bracket 42 attaching hydraulic cylinder 34 to carriage beam 36. Hydraulic control panel 32 includes a hydraulic pump on off switch 33. Fixture frame 26 constructed in a generally triangular configuration has an upper apex for attaching to carriage beam 36 and further includes at said attachments welding ground bracket 27 fixture pivot shaft 28 an electric power ground wire 29 attached to shaft 28.

Weld fixture system 10 further includes a pair of opposing check valves 52 that are ultimately associated with hydraulic pump 24.

Weld fixture system 10 includes as noted clamp mechanism 30. As demonstrated in FIGS. 8 and 9 clamp mechanism 30 includes a clamp arm 46 that when moved into a closed position urges shell 12 on to stop 44. Clamp arm 46 pivots into closed and open positions utilizing pivot mechanism 47 attached to carriage beam 36. Clamp on 46 is secured position when clamp activating cylinder 50 urges cylinder rod end 48 directionally towards the proximate end of carriage beam 36 and the action of cylinder rod and 48 pushing against pivot mechanism 47 alternately rotates clam arm 46 into the close position as seen in FIG. 9. In the open position, as demonstrated in FIG. 8, there is an initial clearance or cavity 54 between shell 12 and stop 44. Once client mechanism 30 is closed clearance 54 is no longer present as shell 12 is fixed into position against stop 44. The system includes check about 52 that is operatively associated with hydraulic pump 24 and in shores that during a welding operation clamp mechanism 30 remains in a rigid closed position in order to hold shell 12 in place.

Weld fixture system 10 is constructed and arranged such that carriage beam 36 is oriented in an angular orientation in order that a person can access and weld shell 12 as desired. The system includes a first spirit level 56 and a second spirit level 58 whereby first spirit level 56 is positioned to indicate level of an initial placement of shell 12 on carriage beam 36 and second spirit level 58 his positioned to indicate angular orientation when carriage beam 36 is tilted.

As demonstrated in FIG. 1A-1D, shell 12 is positioned in angular orientation such that a user utilizing a welding electrode or MIG gun 14 is able to easily access weld cavity 16.

In one embodiment, weld cavity 16 is a weld groove single V open root with 60-degree inclusive angle, ⅛" gap with no land.

In one embodiment, the angle of the table when rotated all the way down is 48 degrees. The angle of the table can be adjusted to the variance of the gap in the groove. If the gap is tighter the welder will want to have the angle from 42-45 degrees. If the gap is bigger the welder will want to have more angle from 45-48 degrees.

Figure 11:
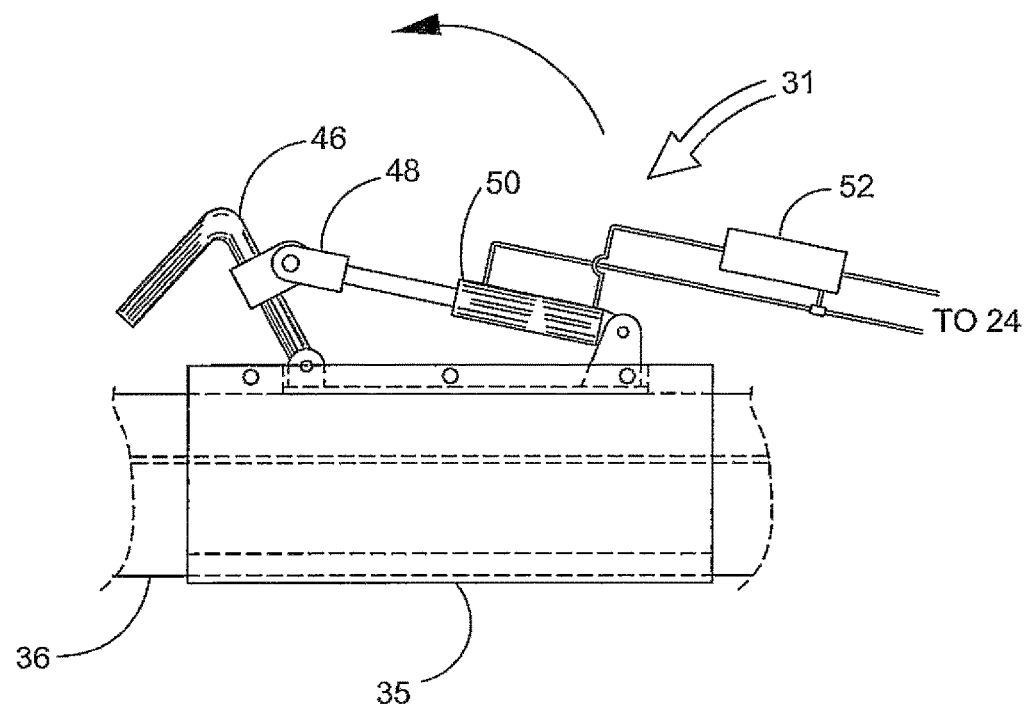
FIG. 11 is a side view demonstrating an additional clamp embodiment according to one embodiment of the present invention.
Figure 12:
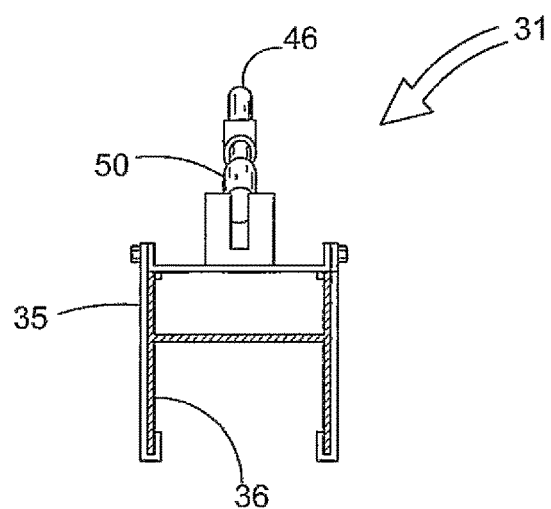
FIG. 12 is an end view from FIG. 11

FIGS. 11 and 12 demonstrate another embodiment whereby adjustable clamp mechanism system 31 moves clamp arm 46 into a closed position by actuating clamp activating cylinder 50 cylinder rod and 48 whereby sliding bracket 35 alternately moves to position clamp arm 46 into closed or open positions as desired. The adjustable clam mechanism system 31 additional attachment can be added opposite of the tilt cylinder for shorter shells.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

What is claimed:

1. A hydraulic pressure vessel long seam welding jig device comprising:
 a triangular frame having a base configured for placement on a floor or other horizontal flat surface and an upper apex;
 a carriage beam having a center affixed to said triangular frame apex in a configuration permitting said carriage beam to tilt in an angular orientation relative to said triangular frame base;
 a pair of hydraulically actuated clamp mechanisms each having a clamp activating hydraulic cylinder operatively associated therewith, whereby each of said clamp mechanisms are positioned on opposite ends of said carriage beam;
 a titling hydraulic cylinder; and
 a hydraulic system constructed and arranged to actuate each of said activating hydraulic cylinder and titling hydraulic cylinder, whereby said jig is constructed and arranged to hold a workpiece during a long seam welding operation.

2. The device of claim 1, wherein said titling hydraulic cylinder is attached at one end to said triangular frame and at another end to said carriage beam.

3. The device of claim 1 wherein said clamp mechanisms include a pair of stops.

4. The device of claim 1 wherein said clamp mechanisms include a pair of fixed non-movable stops.

5. The device of claim 1 wherein said clamp mechanisms include a pair of movable stops.

6. The device of claim 1 wherein said clamp mechanisms include a clamp arm actuated into a closed and locked position by said clamp activating hydraulic cylinder.

* * * * *